(12) United States Patent
Wassung et al.

(10) Patent No.: US 12,155,407 B2
(45) Date of Patent: Nov. 26, 2024

(54) ULTRA-HIGH DYNAMIC RANGE TRANSCEIVER

(71) Applicant: BAE Systems Information and Electronic Systems Integration Inc., Nashua, NH (US)

(72) Inventors: Edward M. Wassung, Goffstown, NH (US); Joseph A. Amato, Hollis, NH (US); Nathaniel J. Conway, Nashua, NH (US); Anthony J. Puzzo, Merrimack, NH (US); Dean W. Howarth, Sudbury, MA (US); Mark A. Wile, Mason, NH (US); Joon-Ho J. Lee, Cambridge, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 438 days.

(21) Appl. No.: 17/738,671

(22) Filed: May 6, 2022

(65) Prior Publication Data

US 2023/0361800 A1 Nov. 9, 2023

(51) Int. Cl.
*H04B 1/40* (2015.01)

(52) U.S. Cl.
CPC ..................... *H04B 1/40* (2013.01)

(58) Field of Classification Search
CPC ....................................................... H04B 1/40
See application file for complete search history.

(56) References Cited

U.S. PATENT DOCUMENTS

| 6,933,878 | B1* | 8/2005 | Molyneux-Berry | .... G01S 7/032 |
| | | | | 342/131 |
| 7,003,275 | B1* | 2/2006 | Petrovic | .................... H04L 5/06 |
| | | | | 455/114.3 |
| 7,646,264 | B2* | 1/2010 | Petrovic | .................. H04J 1/085 |
| | | | | 333/176 |
| 8,428,542 | B2* | 4/2013 | Bornazyan | ........... H04B 1/1081 |
| | | | | 455/278.1 |
| 8,879,583 | B1* | 11/2014 | Brock | ................. H04L 25/0286 |
| | | | | 370/480 |
| 9,673,854 | B2* | 6/2017 | Choi | ....................... H04B 1/525 |
| 2006/0128339 | A1* | 6/2006 | Petrovic | .................. H04J 1/085 |
| | | | | 455/296 |

(Continued)

*Primary Examiner* — Hai V Nguyen
(74) *Attorney, Agent, or Firm* — Scott J. Asmus (57) ABSTRACT

A transceiver includes a radio frequency (RF) input, an RF channelized digital receiver, an RF wideband digital receiver, an analog-to-digital converter (ADC)/digital-to-analog converter (DAC), an RF channelized digital transmitter, and an RF output. The RF channelized digital receiver is configured to split an analog RF input signal into a plurality of sub-octave contiguous frequency band channels and to convert the channels to a plurality of first digital signals. The RF wideband receiver is configured to convert the analog RF input signal into a second digital signal. The ADC/DAC is configured to process each of the first and second digital signals to produce a plurality of third digital signals. The RF channelized digital transmitter is configured to convert each of the third digital signals into a plurality of analog output signals, to combine the analog output signals into an analog RF output signal, and to transmit the analog RF output signal.

20 Claims, 7 Drawing Sheets

(56) References Cited

U.S. PATENT DOCUMENTS

| | | | |
|---|---|---|---|
| 2012/0062404 A1* | 3/2012 | Lin ........................ | H03M 1/08 |
| | | | 341/155 |
| 2013/0225099 A1* | 8/2013 | Vosburgh ............. | H04B 1/1018 |
| | | | 455/306 |
| 2016/0118995 A1* | 4/2016 | Chang ..................... | H04B 7/10 |
| | | | 341/118 |
| 2016/0142084 A1* | 5/2016 | Chang ................... | H03M 1/002 |
| | | | 375/346 |
| 2016/0226535 A1* | 8/2016 | Choi ..................... | H04B 1/525 |
| 2022/0343050 A1* | 10/2022 | Sagar ................... | G06F 30/392 |

\* cited by examiner

ULTRA-HIGH DYNAMIC RANGE TRANSCEIVER

FIELD OF DISCLOSURE

The present disclosure relates to radio signal transceivers and more particularly to multi-octave RF bandwidth transceivers.

BACKGROUND

In certain applications, such as electronic support measure (ESM) and communication support measure (CSM) systems, receivers of radio frequency (RF) signals are increasingly being used across wide frequency ranges with high signal dynamic range. A potential for strong co-channel interference, particularly in very high frequency (VHF) and ultra high frequency (UHF) portions of the spectrum, can lead to performance degradation in dense signal environments. Due to hardware limitations, complex receiver designs are needed for providing noise-limited frequency coverage over a wider range of frequencies.

Although the following detailed description will proceed with reference being made to illustrative examples, many alternatives, modifications, and variations thereof will be apparent in light of this disclosure.

DETAILED DESCRIPTION

Overview

In accordance with an example of the present disclosure, a transceiver includes a radio frequency (RF) input, an RF channelized digital receiver, an RF wideband digital receiver, a field programmable gate array (FPGA), an RF channelized digital transmitter, and an RF output. The RF channelized digital receiver is configured to split an analog RF input signal into a plurality of sub-octave contiguous frequency band channels and to convert the channels to a plurality of first digital signals. The RF wideband receiver is configured to convert the analog RF input signal into a second digital signal. An analog-to-digital converter (ADC) and digital-to-analog converter (DAC) is configured to process each of the first digital signals and the second digital signal to produce a plurality of third digital signals. The RF channelized digital transmitter is configured to convert each of the third digital signals into a plurality of analog output signals, to combine the analog output signals into an analog RF output signal, and to transmit the analog RF output signal.

In further detail, the present disclosure relates to RF transceivers and more particularly to a transceiver configured to receive and process a multi-octave RF bandwidth using multiple narrowband contiguous analog-to-digital channels. The disclosed transceiver has a unique combination of high sensitivity, wide instantaneous multi-octave bandwidth, and a large instantaneous spurious free dynamic range (e.g., greater than 80 dB). An input, or receive, portion of the transceiver includes multiple parallel receive channels that enable simultaneous multiple narrowband channels to be received over a relatively wide instantaneous bandwidth. Similarly, an output, or transmit, portion of the transceiver includes multiple parallel transmit channels that enable simultaneous multiple narrowband channels to be transmitted over the same instantaneous bandwidth.

In some examples, the transceiver is configured to provide coverage from approximately 20-1050 MHZ, with high sensitivity and improved spurious free dynamic range. The transceiver includes an RF channelized digital receiver that utilizes a low insertion loss filter frequency multiplexer and provides both RF frequency channelization for harmonic and interfering signal suppression while also minimizing the effect of front end loss on the noise figure of the receiver, thus maximizing the signal sensitivity of the receiver.

As noted above, providing instantaneous frequency coverage over a wide range of frequencies involves complex transceiver designs. Some existing designs, for example, are configured for a high dynamic range, which may not permit instantaneous coverage over the entire desired frequency range. Rather, to achieve a high dynamic range, such existing transceivers utilize either high fidelity narrowband digital converters that are scanned across a range of frequencies via RF circuitry, or broadband direct sampling digitizers that are limited in spurious free dynamic range (typically 40 to 50 dB) and vulnerable to undesired harmonic content and high power in-band interfering signals. Such high dynamic range designs severely limit the performance of the receiver in an RF spectrum environment with a high density of emitters, such as found in the very high frequency (VHF) to ultra-high frequency (UHF) portions of the spectrum. Therefore, non-trivial issues remain with respect to existing RF transceivers covering wide frequency bands or multiple frequency octaves.

Current RF electronic warfare (EW) systems, and the like, use enhanced sensitivity, higher dynamic range, and more instantaneous RF bandwidth than other types of systems for operation against advanced adaptive threats in dense environments. Such operation is particularly challenging in the VHF/UHF frequency bands where the target spectrum can start as low as approximately 20 MHz and extend upward to over approximately one gigahertz, covering at least six octaves. Attempting to achieve high dynamic range presents a strain on the on the upper end of the dynamic range due to the non-linear characteristics of the receiver components, which produce spurious components at harmonics of the input frequency that fall within the operating bandwidth.

Ultra-High Dynamic Range Transceiver

Figure 1:
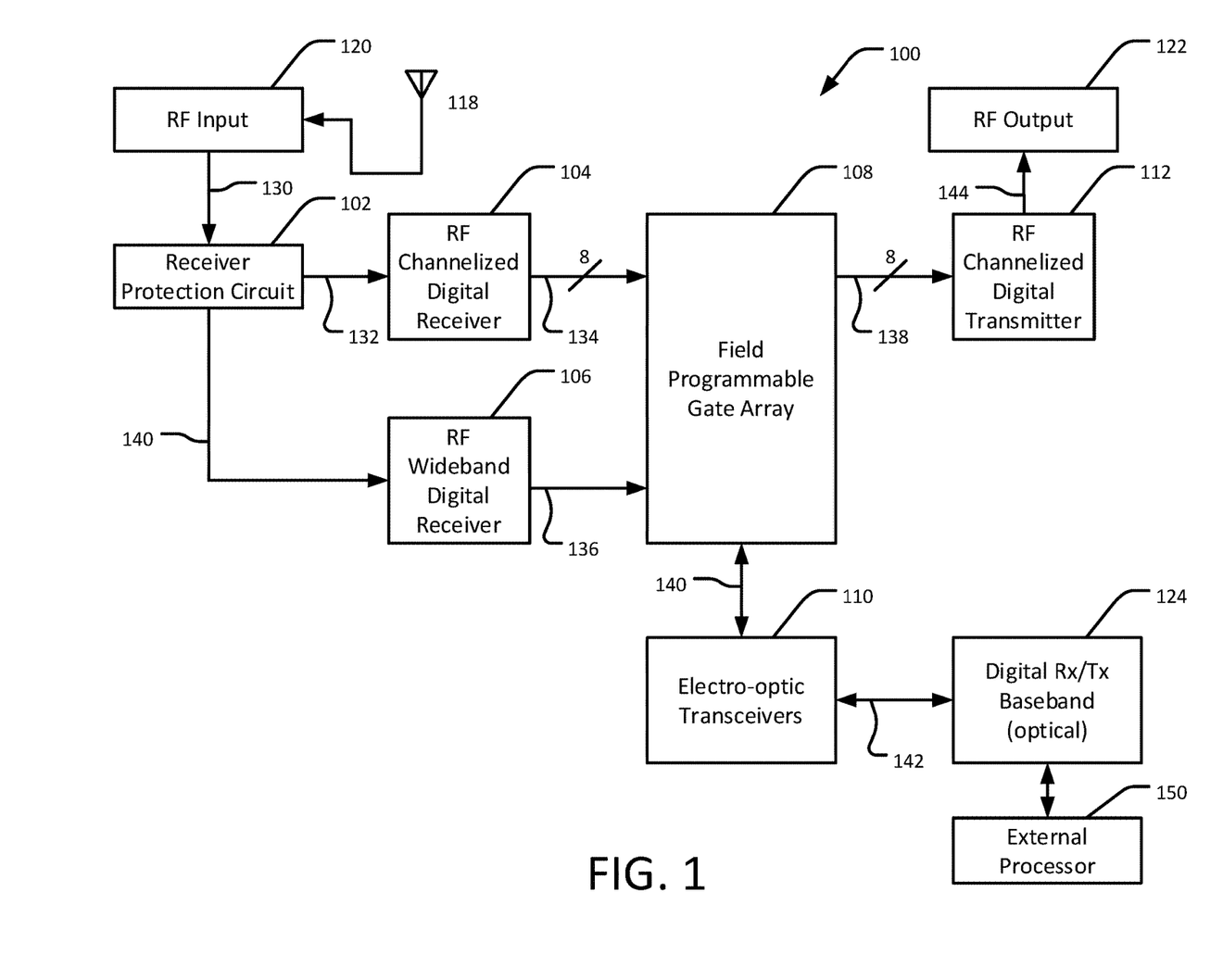
FIG. 1 is block diagram of a transceiver, in accordance with an example of the present disclosure.

FIG. 1 is block diagram of a transceiver 100, in accordance with an example of the present disclosure. The transceiver 100 includes a receiver protection circuit 102, an RF channelized digital receiver 104, an RF wideband digital receiver 106, a field programmable gate array (FPGA) 108, one or more electro-optic transceivers 110, and an RF channelized digital transmitter 112. The transceiver 100 is configured to receive an RF input signal 120 and to produce an analog RF output signal 122.

The receiver protection circuit 102 receives an RF input signal 130 from the RF input 120 and is configured to condition the RF input signal 130 for protecting other components of the transceiver 100 from damage due to extremely high-power in the RF input signal 130. For example, the receiver protection circuit 102 can be configured as a clipper circuit designed to pass a low-power RF signal 132 received from an antenna 118 while clipping high-power signals, such as caused by electrostatic discharge (ESD), lightning, or high voltage inputs.

The RF channelized digital receiver 104 receives the conditioned, low-power RF signal 132. The RF channelized digital receiver 104 includes a frequency multiplexer, which splits bands of the low-power RF signal 132 into multiple (e.g., eight) sub-octave contiguous frequency band channels. Each sub-octave frequency band channel is processed in parallel by a corresponding analog-to-digital converter (ADC) to produce multiple (e.g., eight) digital receive (Rx) baseband channels 134, such as discussed in further detail with respect to FIG. 3.

Figure 2:
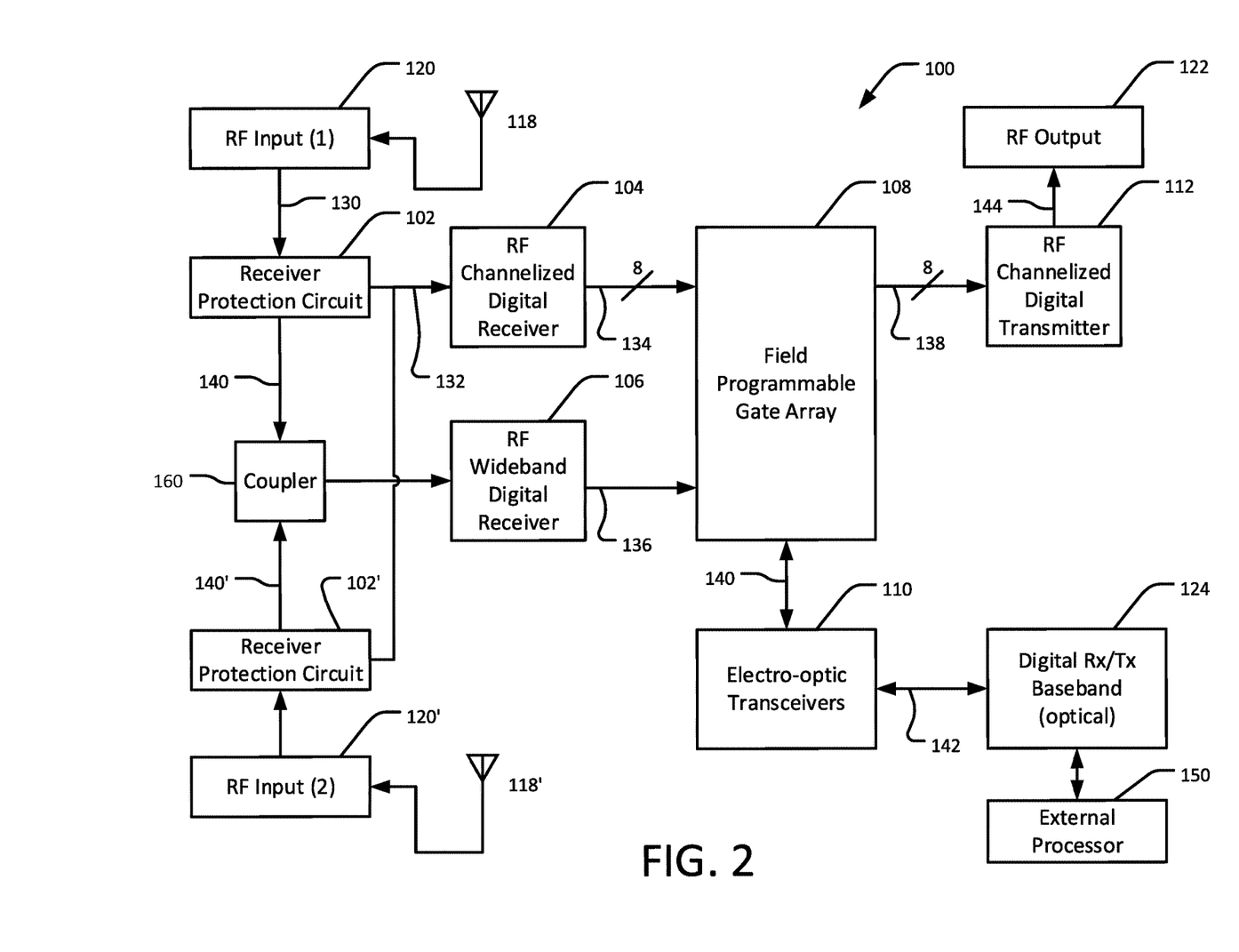
FIG. 2 is a block diagram of a transceiver, in accordance with another example of the present disclosure.

In parallel to the RF channelized digital receiver 104, the RF wideband digital receiver 106 receives a coupled port of the receiver channel 140. In some examples, such as shown in FIG. 2, the input to the RF wideband digital receiver 106 can be sourced either from the first RF input 120 or, using one or more switches (not shown), from a second RF input 120' via a separate receiver protection circuit 102', which may come from a separate antenna element 118', enabling a simultaneous two-channel capability via the RF channelized digital receiver 104 and the RF wideband digital receiver 106. A directional dual coupler 160 can be, for example, a passive device that couples the electromagnetic power from either the RF input 120 or the RF input 120' (as separately switched) to the RF wideband digital receiver 106.

The digital Rx baseband channels 134, 136 of the RF channelized digital receiver 104 and the RF wideband digital receiver 106, respectively, are complex digital baseband representations of the tuned spectrum. The FPGA 108 receives the digital Rx baseband channels 134, 136 and packages the data for transport. Additional processing on digital receive/transmit baseband signals 124 can be performed externally from the transceiver 100 by an external processor 150 via the electro-optic transceivers 110. Note that the external processor 150 is not necessarily included in the transceiver 100, but rather can communicate with the transceiver 100 via the electro-optic transceivers 110. The transceiver 100 minimizes the amount of digital noise that can feed back to the analog input 120 from the digital processing elements of the FPGA 108. In some examples, the amount of processing inside the FPGA 108 is relatively low. The amount and bandwidth of the signal lines that extend to the analog side is managed as to mitigate any potential signal degradation and the interface to the external processor 150 is electrically isolated from the receiver via the electro-optic transceivers 110. The conversion to optics by the electro-optic transceivers 110 for the data medium allows for further distance between the transceiver 100 and the external processor 150. Note that the interfaces 140, 142 are bidirectional, where transmit waveforms originate from the external processor 150 and are input to the transceiver 100 via the optical link 142.

Figure 6:
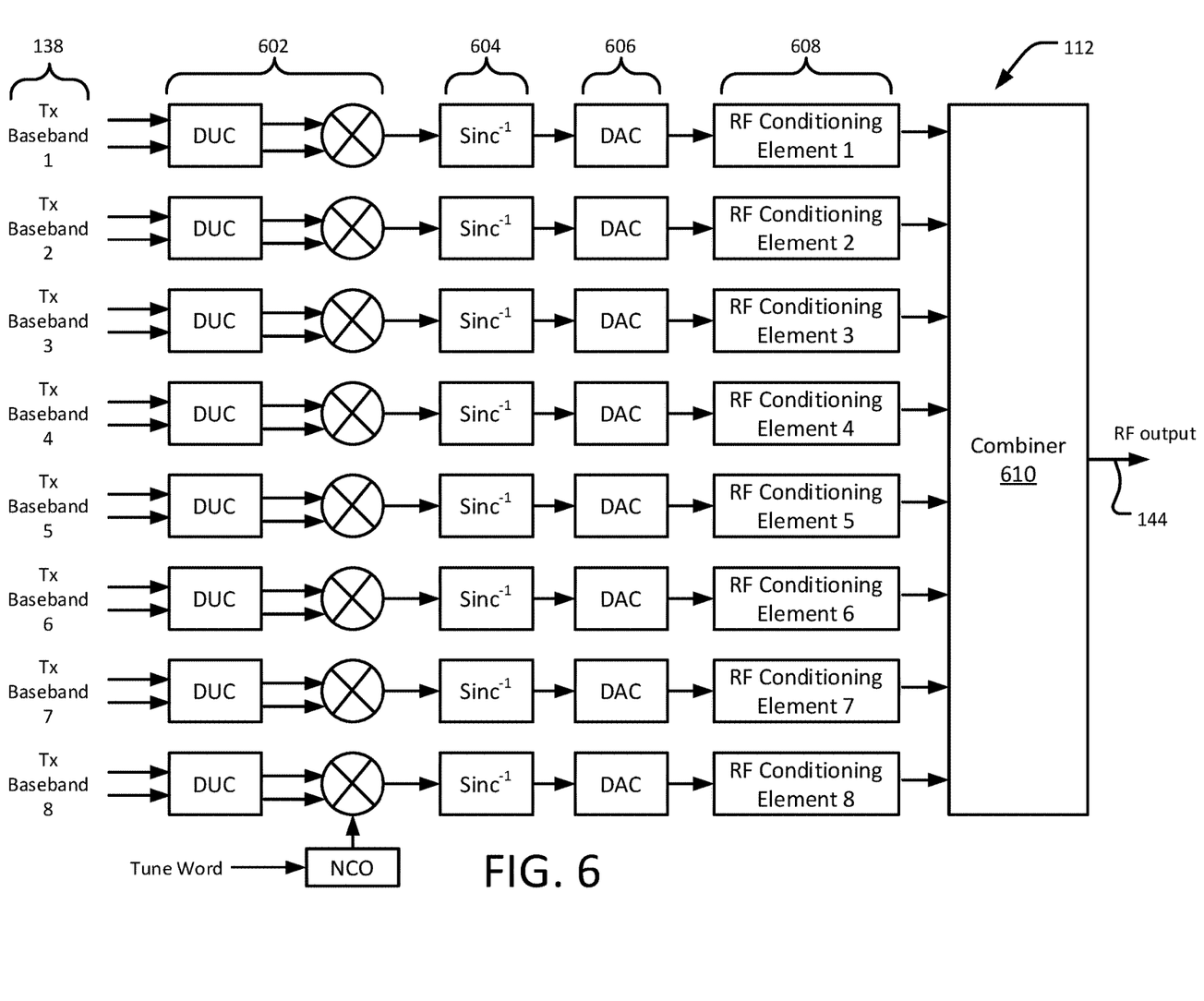
FIG. 6 is a block diagram of an RF channelized digital transmitter of the transceiver of FIG. 1, in accordance with an example of the present disclosure.

The FPGA 108 provides multiple (e.g., eight) channels of digital transmit (Tx) baseband data streams 138, which are sent to the RF channelized digital transmitter 112, where the digital signal is converted back to an analog RF output signal 144 for output at the RF output 122, such as described in further detail with respect to FIG. 6. The RF channelized digital transmitter 112 converts the receive baseband spectrums back to RF where they exit the transceiver 100. In some examples, the RF output 122 drives an external power amplifier for transmission out to an antenna element. Other choices of routing the RF output can be used to provide an internal Built-in-Test (BIT) and to provide high fidelity receiver characterization. One example of a characterization function is a multi-tone waveform for calculating and storing the group/phase delay of the receiver across all the RF and digital sub-bands, producing useful calibration data for advanced receiver capabilities.

RF Channelized Digital Receiver

Figure 3:
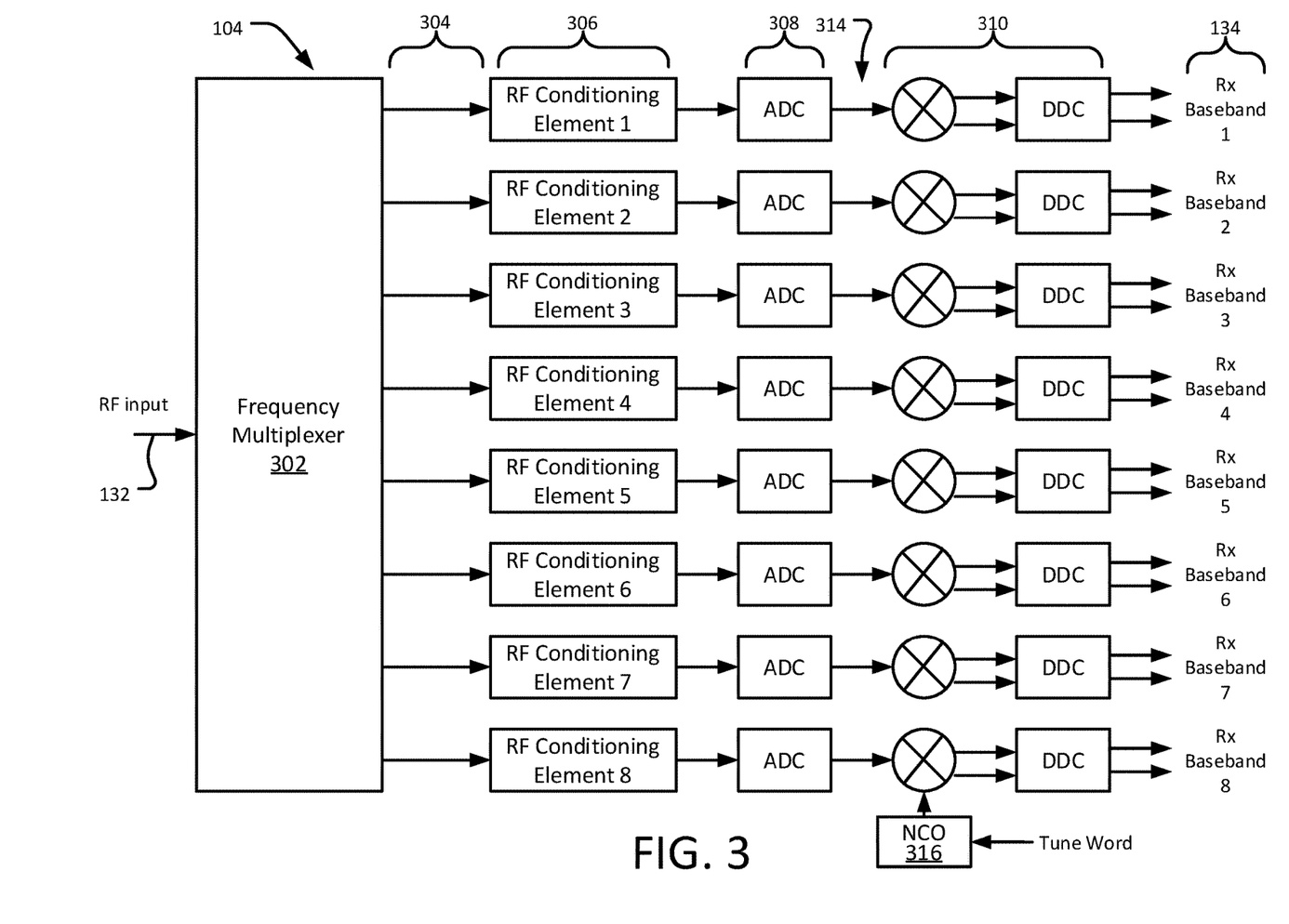
FIG. 3 is a block diagram of an RF channelized digital receiver of the transceiver of FIG. 1, in accordance with an example of the present disclosure.

FIG. 3 is a block diagram of the RF channelized digital receiver 104 of FIG. 1, in accordance with an example of the present disclosure. The RF channelized digital receiver 104 includes a frequency multiplexer 302 configured to output a plurality of sub-octave contiguous frequency band channels 304 (e.g., eight channels), a plurality of RF conditioning elements 306 (one for each channel 304 output from the frequency multiplexer 302), a plurality of ADCs 306 (one for each channel 304), a plurality of digital down converters (DDC) 310 (one for each channel 304) that each output the digital Rx baseband channels 134.

The low-power RF signal 132 from the RF channelized digital receiver 104 can include frequencies in the range from approximately 20-1050 MHZ. The frequency multiplexer 302 is configured to split the RF input 132 into the multiple (e.g., eight) sub-octave contiguous frequency band channels 304 for input into the respective ADCs 308. The frequency multiplexer 302 helps the RF channelized digital receiver 104 achieve a high dynamic range by using analog channelization of the RF spectrum before any non-linear RF components, thus effectively producing a high intercept point, while exhibiting a low-loss power split into the sub-octave contiguous frequency band signals 304, enabling an exceptionally low noise figure which directly improves the minimal discernable signal (MDS) of the transceiver 100. The frequency multiplexer 302 in the disclosed arrangement provides approximately a 4 dB improvement over a standard eight-way power splitter.

RF Conditioning Elements

Figure 4:
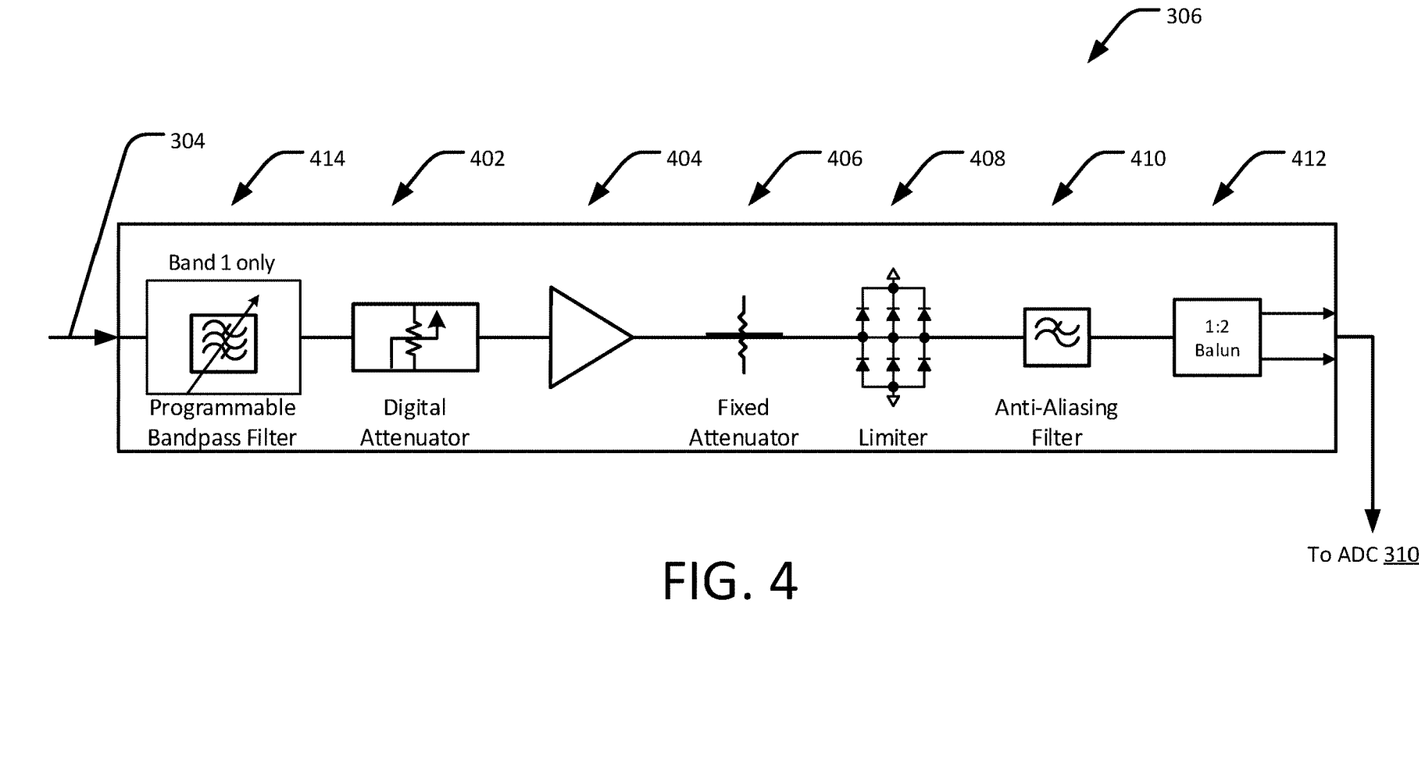
FIG. 4 is a block diagram of an RF conditioning element of the RF channelized digital receiver of FIG. 3, in accordance with an example of the present disclosure.

Each of the RF conditioning elements 306 (also labeled Rx Conditioning Element 1-8 in FIG. 3) receives one of the sub-octave contiguous frequency band signals 304 from the frequency multiplexer 302. FIG. 4 is a block diagram of one of the RF conditioning elements 306 of FIG. 3, in accordance with an example of the present disclosure. Each of the RF conditioning elements 306 in this example includes a digital attenuator 402, an amplifier 404, a fixed attenuator 406, a limiter 408, an anti-aliasing filter 410, and a 1:2 balun 412. In some examples, each of the RF conditioning elements 306 are substantially identical except for band 1, which can further include a programmable analog band-pass filter 414 for controlling the frequency bandwidth (e.g., 5-70 MHz) of the first channel 304. A tunable filter can be inserted into band 1 to limit the number of subharmonic parallel paths, which conserves size, power and cost by eliminating the need for two additional RF paths. Note that each of the RF conditioning elements 306 has a high second and third order intercept point such that the intercept point does not adversely affect the overall linearity of the transceiver 100.

The digital attenuator 402 is configured to insert a programmable amount of loss into the respective frequency channel 304. The digital attenuator 402 is configured to extend the total instantaneous dynamic range by a factor of approximately 30 dB, in that it extends the upper range of the linear region on a RF channelized basis, only desensitizing one slice of the frequency spectrum. For example, the digital attenuator 402 can be engaged when a high-power adjacent channel interferer is present, which allows the other channels to effectively process low level signals at the same time.

The amplifier 404 is the first active RF element in the RF conditioning element 306 following the digital attenuator 402. This amplifier 404 is configured to provide sufficient gain and exhibit a noise figure for achieving the required sensitivity of the transceiver 100. The amplifier 404 has a third order intercept point selected to preserve 80 dB of spur-free dynamic range (SFDR), for example, a two-signal dynamic range, which influences the level of the spurious component that falls within the bandwidth of the respective channel 304.

The fixed attenuator 406 and the diode-based signal limiter 408 protect the subsequent devices, such as the ADC 308, from RF power levels that may cause component damage. The limiter 408 is a non-linear device, and thus the third order intercept point is selected to preserve the SFDR.

Before the received signal is presented to the ADC 308, the single-ended, low-pass anti-aliasing filter 410 filters frequencies greater than one-half of the sample rate frequency (e.g., 3 GHz/2) to prevent signals higher than approximately 1500 MHz from aliasing back into the receiver band. The 1:2 balun 412 converts the output of the anti-aliasing filter 410 to a differential signal, which provides a differential signal to the ADC 308.

Referring again to FIG. 3, the ADCs 308 are directly driven with the respective output of each RF conditioning element 306 to produce a digital signal 314, which provides linearity at the higher end of the amplitude scale. Following the ADC 308, the DDC 310 converts the digital signal 314 to the digital Rx baseband channels 134. The DDC 310 utilizes a complex multiplier that multiplies the real digital signal with the output of a complex numerically controlled oscillator (NCO) 316, digitally decimated (e.g., by 16), and filtered with a half-band filter. Note that for clarity only one NCO 316 is shown in FIG. 3; however, it will be understood that each DDC 310 includes an NCO 316 such as shown for Rx Baseband 8. Further note that the NCO 316 can be tuned by a tune word to the center of the analog receive band to further channelize the RF spectrum. In some examples, the center frequency of the NCO 316 can be moved to shift the spectrum. This is a feature of band 8, where the input bandwidth is larger than I/Q update rate and can thus be placed to receive anywhere from approximately 615 MHZ to approximately 1050 MHz. After the DDC 310, a converter converts all channels of the baseband data with an update rate of 187.5 MHz, or 93.75 pending decimation, to a high-speed serial stream, which is provided to the FPGA 108 for further conditioning and for output to the electro-optic transceivers 110.

RF Wideband Digital Receiver

Figure 5:
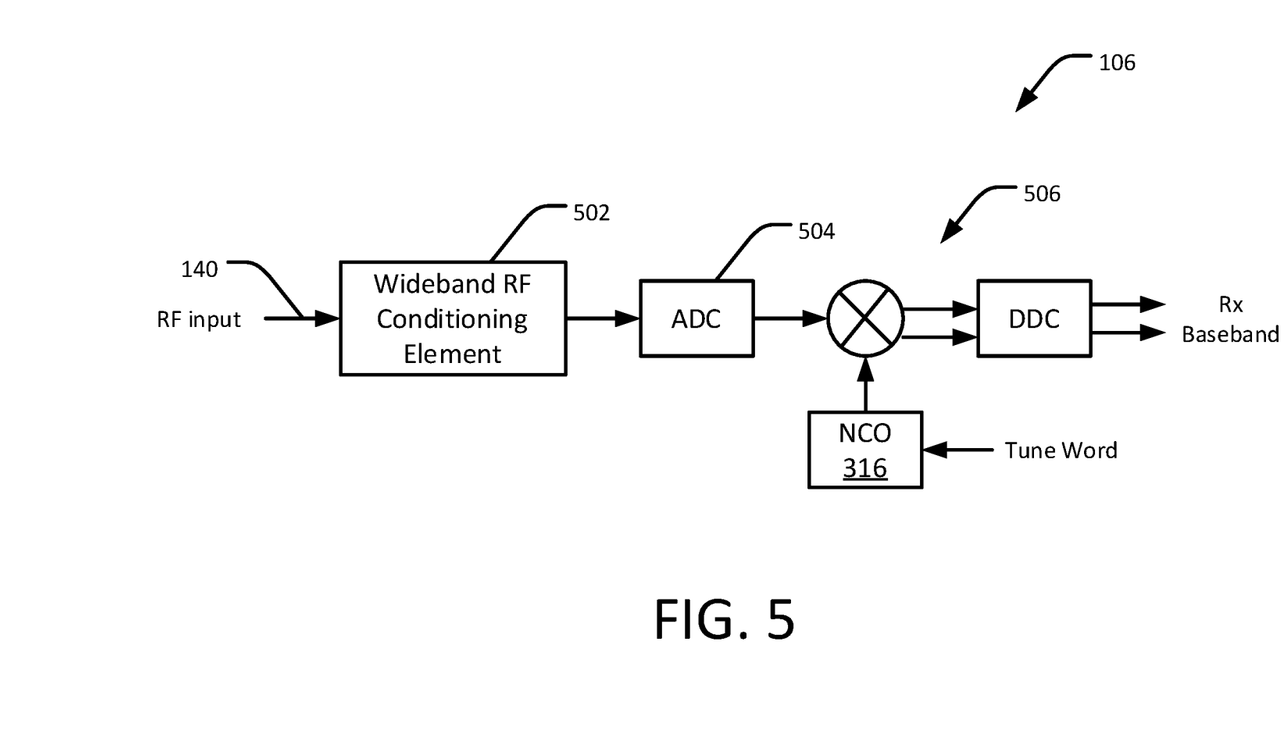
FIG. 5 is a block diagram of an RF wideband digital receiver of the transceiver of FIG. 1, in accordance with an example of the present disclosure.

FIG. 5 is a block diagram of the RF wideband digital receiver 106 of FIG. 1, in accordance with an example of the present disclosure. The RF wideband digital receiver 106 includes a wideband RF conditioning element 502, an ADC 504, and a DDC 506. The structure of the RF conditioning element 502 is similar to the RF conditioning elements 306 of FIG. 4, except that the decimation rate of the DDC 506 is a factor of two and the I/Q update rate is 1500 giga samples per second (GSPS), thus covering the full band of interest with one converter. The digital data output by the ADC 504 is converted to a high-speed serial stream and presented to the FPGA 108 for further conditioning and pass through to the electro-optic transceivers 110 out to the external processor 150.

RF Channelized Digital Transmitter

FIG. 6 is a block diagram of the RF channelized digital transmitter 112 of FIG. 1, in accordance with an example of the present disclosure. The RF channelized digital transmitter 112 includes a plurality of digital upconverters 602 (one for each channel 138 output from the FPGA 108), a plurality of inverse sinc waveform reconstruction modules 604 (one for each channel 138 output from the FPGA 108), a plurality of digital-to-analog converters 606 (one for each channel 138 output from the FPGA 108), a plurality of RF conditioning elements 608 (one for each channel 138 output from the FPGA 108), and a signal combiner 610 that provides the analog RF output signal 144 to the RF output 122. As noted above, the FPGA 108 outputs multiple (e.g., eight) channels of Tx digital baseband signals 138 that substantially represent the corresponding digital Rx baseband channels 134 on the receive side. In some examples, the outputs 138 of the FPGA 108 contain additional conditioning and modulations, depending on the use case of the transceiver 100.

The digital upconverters 602 convert the digital Tx baseband signals 138 to the original RF frequency by essentially reversing the frequency decimation process on the receive side. For example, the digital upconverters 602 interpolate the I/Q samples of the digital Tx baseband signals 138 at 187.5 or 93.75 mega samples per second (MSPS) by a factor of 32 up to the DAC sample rate of 6 GSPS. The inverse sinc waveform reconstruction modules 604 compensate for the zero-order hold response of the DAC using a (x)/sin (x) output finite impulse response (FIR) filter. Advantages of the channelized transmitter architecture over a single wideband DAC output include, for example, the ability to further normalize the output amplitude over smaller regions of frequency and as well as an inherently better overall dynamic range. The output of each DAC 606 is followed by a transmit RF conditioning element 608, which in some examples includes a reconstruction low pass filter with a digital attenuator for output gain adjustment. All channels are passed to an eight-way power combiner 610 to produce the analog RF output signal 144.

Example Signal Processing Methodology

Figure 7:
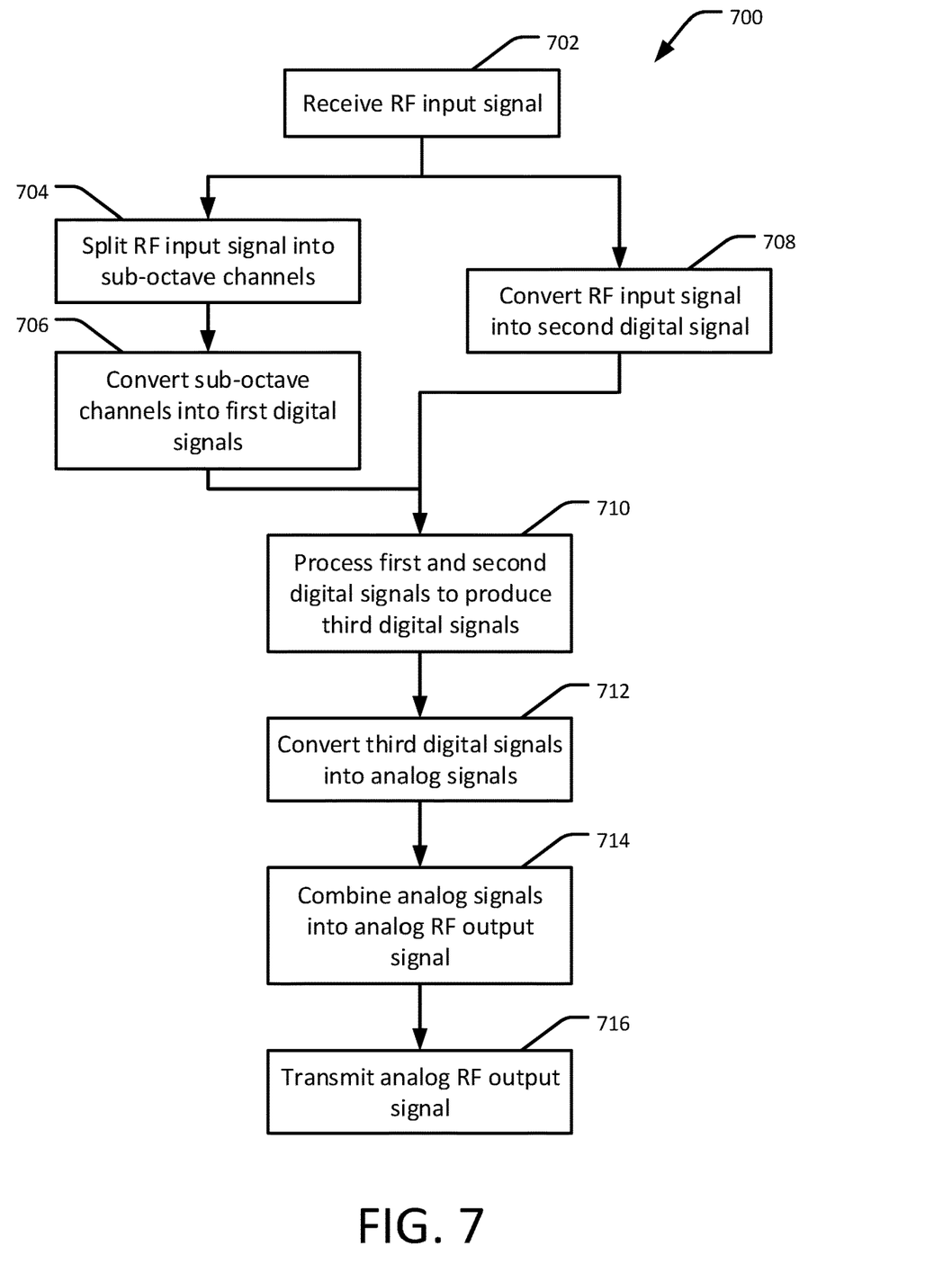
FIG. 7 is a flow diagram of a signal processing methodology, in accordance with an example of the present disclosure.

FIG. 7 is a flow diagram of a signal processing methodology 700, in accordance with an example of the present disclosure. The methodology 700 can be implemented, for example, in the transceiver 100 of FIG. 1. The methodology 700 includes receiving 702, via a radio frequency (RF) input, an analog RF input signal. The methodology 700 further includes splitting 704, by an RF channelized digital receiver coupled to the RF input, the analog RF input signal into a plurality of sub-octave contiguous frequency band channels and converting 706, by the RF channelized digital receiver, the sub-octave contiguous frequency band channels to a plurality of first digital signals. In some examples, the methodology 700 further includes converting 708, by an RF wideband digital receiver coupled to the RF input, the RF input signal into a second digital signal.

The methodology 700 further includes processing 710, by an ADC/DAC to the RF channelized digital receiver and the RF wideband digital receiver, each of the first digital signals and the second digital signal to produce a plurality of third digital signals. Such processing can be customized to suit a given application of the RF input signal to the RF output signal, and can be performed by any suitable processor, including but not limited to the ADC/DAC or other types of processors. The methodology 700 further includes converting 712, by an RF channelized digital transmitter coupled to the ADC/DAC, each of the third digital signals into a plurality of analog output signals and combining 714, by the RF channelized digital transmitter, the plurality of analog output signals into an analog RF output signal. The methodology 700 further includes transmitting 716, via an RF output coupled to the RF channelized digital transmitter, the analog RF output signal.

FURTHER EXAMPLE EXAMPLES

The following examples pertain to further examples, from which numerous permutations and configurations will be apparent.

Example 1 provides a transceiver including a radio frequency (RF) input configured to receive an analog RF input signal; an RF channelized digital receiver coupled to the RF input, the RF channelized digital receiver configured to split the analog RF input signal into a plurality of sub-octave contiguous frequency band channels and to convert the sub-octave contiguous frequency band channels to a plurality of first digital signals; an RF wideband digital receiver coupled to the RF input configured to convert the analog RF input signal into a second digital signal; an analog-to-digital converter (ADC)/digital-to-analog converter (DAC) coupled to the RF channelized digital receiver and the RF wideband digital receiver, the ADC/DAC configured to process each of the first digital signals and the second digital signal to produce a plurality of third digital signals; an RF channelized digital transmitter coupled to the ADC/DAC, the RF channelized digital transmitted configured to convert each of the third digital signals into a plurality of analog output signals and to combine the plurality of analog output signals into an analog RF output signal; and an RF output coupled to the RF channelized digital transmitter and configured to transmit the analog RF output signal.

Example 2 includes the subject matter of Example 1, wherein the RF channelized digital receiver includes a multiplexer configured to split the RF input signal into the plurality of sub-octave contiguous frequency band channels.

Example 3 includes the subject matter of Example 2, wherein the RF channelized digital receiver further includes a plurality of RF conditioning elements each configured to condition respective ones of the sub-octave contiguous frequency band channels.

Example 4 includes the subject matter of any one of Examples 2 and 3, wherein the RF channelized digital receiver further includes a plurality of analog-to-digital converters each configured to convert respective ones of the sub-octave contiguous frequency band channels into respective ones of the first digital signals.

Example 5 includes the subject matter of Example 4, wherein the RF channelized digital receiver further includes a plurality of digital down converters each configured to convert respective ones of the first digital signals to a plurality of digital receive (Rx) baseband channels.

Example 6 includes the subject matter of any one of Examples 1-5, wherein the RF channelized digital transmitter includes a plurality of digital upconverters each configured to convert respective ones of the third digital signals into the analog RF output signal.

Example 7 includes the subject matter of any one of Examples 1-6, wherein the RF channelized digital transmitter includes a plurality of digital-to-analog converters each configured to convert respective ones of the third digital signals into the analog RF output signal.

Example 8 includes the subject matter of any one of Examples 1-7, further including a field programmable gate array (FPGA) coupled to the RF channelized digital receiver and the RF wideband digital receiver and one or more electro-optic transceivers coupled to the FPGA, the one or more electro-optic transceivers configured to transmit optical signals between the FPGA and an external processor.

Example 9 provides a method of processing a signal. The method includes receiving, via a radio frequency (RF) input, an analog RF input signal; splitting, by an RF channelized digital receiver coupled to the RF input, the analog RF input signal into a plurality of sub-octave contiguous frequency band channels and converting, by the RF channelized digital receiver, the sub-octave contiguous frequency band channels to a plurality of first digital signals; converting, by an RF wideband digital receiver coupled to the RF input, the RF input signal into a second digital signal; processing, by an ADC/DAC coupled to the RF channelized digital receiver and the RF wideband digital receiver, each of the first digital signals and the second digital signal to produce a plurality of third digital signals; converting, by an RF channelized digital transmitter coupled to the ADC/DAC, each of the third digital signals into a plurality of analog output signals and combining, by the RF channelized digital transmitter, the plurality of analog output signals into an analog RF output signal; and transmitting, via an RF output coupled to the RF channelized digital transmitter, the analog RF output signal.

Example 10 includes the subject matter of Example 9, further including conditioning, by the RF channelized digital receiver, each of the sub-octave contiguous frequency band channels.

Example 11 includes the subject matter of any one of Examples 9 and 10, further including converting, by the RF channelized digital receiver, respective ones of the first digital signals to a plurality of digital receive (Rx) baseband channels, wherein the plurality of third digital signals is produced based on the digital receive baseband channels.

Example 12 includes the subject matter of any one of Examples 9-11, further including converting, by the RF channelized digital transmitter, respective ones of the third digital signals into the analog RF output signal.

Example 13 includes the subject matter of any one of Examples 9-12, further including transmitting, by one or more electro-optic transceivers, optical signals between an external processor and a field programmable gate array (FPGA) coupled to the RF channelized digital receiver and the RF wideband digital receiver.

Example 14 provides a transceiver including an RF channelized digital receiver configured to split an RF input signal into a plurality of sub-octave contiguous frequency band channels and to convert the sub-octave contiguous frequency band channels to a plurality of first digital signals; an analog-to-digital converter (ADC)/digital-to-analog converter (DAC) coupled to the RF channelized digital receiver and the RF wideband digital receiver, the ADC/DAC configured to process each of the first digital signals to produce a plurality of second digital signals; and an RF channelized digital transmitter coupled to the ADC/DAC, the RF channelized digital transmitted configured to convert each of the second digital signals into a plurality of analog output signals and to combine the plurality of analog output signals into an analog RF output signal.

Example 15 includes the subject matter of Example 14, further including an RF wideband digital receiver coupled to the RF input configured to convert the RF input signal into a second digital signal, wherein the ADC/DAC is further configured to process the second digital signal to produce the plurality of second digital signals.

Example 16 includes the subject matter of any one of Examples 14 and 15, wherein the RF channelized digital receiver includes a multiplexer configured to split the RF input signal into the plurality of sub-octave contiguous frequency band channels.

Example 17 includes the subject matter of Example 16, wherein the RF channelized digital receiver further includes a plurality of RF conditioning elements each configured to condition respective ones of the sub-octave contiguous frequency band channels.

Example 18 includes the subject matter of any one of Examples 16 and 17, wherein the RF channelized digital receiver further includes a plurality of analog-to-digital converters each configured to convert respective ones of the sub-octave contiguous frequency band channels into respective ones of the first digital signals.

Example 19 includes the subject matter of any one of Examples 14-18, wherein the RF channelized digital transmitter includes a plurality of digital upconverters each configured to convert respective ones of the second digital signals into the analog RF output signal.

Example 20 includes the subject matter of any one of Examples 14-19, wherein the RF channelized digital transmitter includes a plurality of digital-to-analog converters each configured to convert respective ones of the second digital signals into the analog RF output signal.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A transceiver comprising:
    a radio frequency (RF) input configured to receive an analog RF input signal;
    an RF channelized digital receiver coupled to the RF input, the RF channelized digital receiver configured to split the analog RF input signal into a plurality of sub-octave contiguous frequency band channels and to convert the sub-octave contiguous frequency band channels to a plurality of first digital signals;
    an RF wideband digital receiver coupled to the RF input configured to convert the analog RF input signal into a second digital signal;
    an analog-to-digital converter (ADC)/digital-to-analog converter (DAC) coupled to the RF channelized digital receiver and the RF wideband digital receiver, the ADC/DAC configured to process each of the first digital signals and the second digital signal to produce a plurality of third digital signals;
    an RF channelized digital transmitter coupled to the ADC/DAC, the RF channelized digital transmitted configured to convert each of the third digital signals into a plurality of analog output signals and to combine the plurality of analog output signals into an analog RF output signal; and
    an RF output coupled to the RF channelized digital transmitter and configured to transmit the analog RF output signal.

2. The transceiver of claim 1, wherein the RF channelized digital receiver includes a multiplexer configured to split the RF input signal into the plurality of sub-octave contiguous frequency band channels.

3. The transceiver of claim 2, wherein the RF channelized digital receiver further includes a plurality of RF conditioning elements each configured to condition respective ones of the sub-octave contiguous frequency band channels.

4. The transceiver of claim 2, wherein the RF channelized digital receiver further includes a plurality of analog-to-digital converters each configured to convert respective ones of the sub-octave contiguous frequency band channels into respective ones of the first digital signals.

5. The transceiver of claim 4, wherein the RF channelized digital receiver further includes a plurality of digital down converters each configured to convert respective ones of the first digital signals to a plurality of digital receive (Rx) baseband channels.

6. The transceiver of claim 1, wherein the RF channelized digital transmitter includes a plurality of digital upconverters each configured to convert respective ones of the third digital signals into the analog RF output signal.

7. The transceiver of claim 1, wherein the RF channelized digital transmitter includes a plurality of digital-to-analog converters each configured to convert respective ones of the third digital signals into the analog RF output signal.

8. The transceiver of claim 1, further comprising a field programmable gate array (FPGA) coupled to the RF channelized digital receiver and the RF wideband digital receiver and one or more electro-optic transceivers coupled to the FPGA, the one or more electro-optic transceivers configured to transmit optical signals between the FPGA and an external processor.

9. A method of processing a signal, the method comprising:
    receiving, via a radio frequency (RF) input, an analog RF input signal;
    splitting, by an RF channelized digital receiver coupled to the RF input, the analog RF input signal into a plurality of sub-octave contiguous frequency band channels and converting, by the RF channelized digital receiver, the sub-octave contiguous frequency band channels to a plurality of first digital signals;

converting, by an RF wideband digital receiver coupled to the RF input, the RF input signal into a second digital signal;

processing, by analog-to-digital converter (ADC)/digital-to-analog converter (DAC) coupled to the RF channelized digital receiver and the RF wideband digital receiver, each of the first digital signals and the second digital signal to produce a plurality of third digital signals;

converting, by an RF channelized digital transmitter coupled to the ADC/DAC, each of the third digital signals into a plurality of analog output signals and combining, by the RF channelized digital transmitter, the plurality of analog output signals into an analog RF output signal; and transmitting, via an RF output coupled to the RF channelized digital transmitter, the analog RF output signal.

10. The method of claim 9, further comprising conditioning, by the RF channelized digital receiver, each of the sub-octave contiguous frequency band channels.

11. The method of claim 9, further comprising converting, by the RF channelized digital receiver, respective ones of the first digital signals to a plurality of digital receive (Rx) baseband channels, wherein the plurality of third digital signals is produced based on the digital receive baseband channels.

12. The method of claim 9, further comprising converting, by the RF channelized digital transmitter, respective ones of the third digital signals into the analog RF output signal.

13. The method of claim 9, further comprising transmitting, by one or more electro-optic transceivers, optical signals between an external processor and a field programmable gate array (FPGA) coupled to the RF channelized digital receiver and the RF wideband digital receiver.

14. A transceiver comprising:
an RF channelized digital receiver configured to split an RF input signal into a plurality of sub-octave contiguous frequency band channels and to convert the sub-octave contiguous frequency band channels to a plurality of first digital signals;

an analog-to-digital converter (ADC)/digital-to-analog converter (DAC) coupled to the RF channelized digital receiver, the ADC/DAC configured to process each of the first digital signals to produce a plurality of second digital signals; and an RF channelized digital transmitter coupled to the ADC/DAC, the RF channelized digital transmitted configured to convert each of the second digital signals into a plurality of analog output signals and to combine the plurality of analog output signals into an analog RF output signal.

15. The transceiver of claim 14, further comprising an RF wideband digital receiver coupled to the RF input and configured to convert the RF input signal into a second digital signal, wherein the ADC/DAC is further configured to process the second digital signal to produce the plurality of second digital signals.

16. The transceiver of claim 14, wherein the RF channelized digital receiver includes a multiplexer configured to split the RF input signal into the plurality of sub-octave contiguous frequency band channels.

17. The transceiver of claim 16, wherein the RF channelized digital receiver further includes a plurality of RF conditioning elements each configured to condition respective ones of the sub-octave contiguous frequency band channels.

18. The transceiver of claim 16, wherein the RF channelized digital receiver further includes a plurality of analog-to-digital converters each configured to convert respective ones of the sub-octave contiguous frequency band channels into respective ones of the first digital signals.

19. The transceiver of claim 14, wherein the RF channelized digital transmitter includes a plurality of digital upconverters each configured to convert respective ones of the second digital signals into the analog RF output signal.

20. The transceiver of claim 14, wherein the RF channelized digital transmitter includes a plurality of digital-to-analog converters each configured to convert respective ones of the second digital signals into the analog RF output signal.

* * * * *